US006917818B1

(12) United States Patent
Placho et al.

(10) Patent No.: US 6,917,818 B1
(45) Date of Patent: Jul. 12, 2005

(54) METHOD FOR CONTROLLING SWITCHING-ORIENTED ACTIONS IN A MOBILE RADIO TELEPHONE SYSTEM AND SUCH A MOBILE RADIO TELEPHONE SYSTEM

(75) Inventors: Markus Placho, Schrattenthal (AT); Eftat Topuzoglu, Achau (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/284,530

(22) PCT Filed: Oct. 24, 1997

(86) PCT No.: PCT/DE97/02488

§ 371 (c)(1),
(2), (4) Date: Apr. 14, 1999

(87) PCT Pub. No.: WO98/19483

PCT Pub. Date: May 7, 1998

(30) Foreign Application Priority Data

Oct. 25, 1996 (DE) ......................................... 196 44 458

(51) Int. Cl.[7] ............................................... H04Q 7/20

(52) U.S. Cl. ..................... 455/560; 455/433; 455/418

(58) Field of Search .............................. 455/433, 405, 455/406, 408, 410, 411, 414.1, 417, 418, 419, 422.1, 466, 560, 435.1

(56) References Cited

U.S. PATENT DOCUMENTS

| | | | |
|---|---|---|---|
| 5,153,904 A | | 10/1992 | Coombes et al. |
| 5,329,578 A | | 7/1994 | Brennan et al. |
| 5,396,543 A | * | 3/1995 | Beeson et al. ............... 455/560 |
| 5,926,760 A | * | 7/1999 | Khan et al. .................. 455/435 |
| 5,953,651 A | * | 9/1999 | Lu et al. ...................... 455/408 |

FOREIGN PATENT DOCUMENTS

| | | |
|---|---|---|
| DE | 44 27 043 C1 | 12/1995 |
| DE | 44 27 832 A1 | 2/1996 |

(Continued)

OTHER PUBLICATIONS

Björndahl, P. et al, "CME 20 —A Total Solution for GSM Networks", Ericsson Review, vol. 68, No. 3, (1991), pp. 72–79.

(Continued)

Primary Examiner—Erika A. Gary
(74) Attorney, Agent, or Firm—Morrison & Foerster LLP.

(57) ABSTRACT

Respective mobile radio telephone-specific data for defining conditions (CD1 . . . C6) for a subscriber-dependent control of switching-oriented actions (ACT1 . . . ACT5) are established for one or more mobile subscribers in the mobile switching center (MSC) of the mobile radio-telephone system (PLMN) via the operation and maintenance sub-system (OMS). Given an incoming call (MTC) or an outgoing call (MOC) or given a message transmission (USSD), call-related data and/or subscriber-specific data are evaluated by the mobile switching center with reference to the conditions (CD1 . . . CD6) and, given a satisfied condition (CD2, CD3, CD4), at least one action (ACT2, ACT3, ACT4) is controlled subscriber-dependent. The advantage is that the routing of call connections, the acquisition of the call charges, etc., can be set and implemented subscriber-individually dependent on specific data (call-related and/or subscriber-specific) that is evaluated with reference to the conditions stored in the mobile switching center. What this means for the system operator of the respective mobile radio telephone system is that the operator can himself enter the criteria and parameters for the actions to be controlled into the mobile switching center subscriber-individually in a very flexible way via the operation and maintenance sub-system for individual mobile subscribers or for a plurality of mobile subscribers as well, and can in turn modify these at any time.

19 Claims, 3 Drawing Sheets

FOREIGN PATENT DOCUMENTS

| | | |
|---|---|---|
| DE | 195 15 558 C1 | 9/1996 |
| EP | 0 715 473 A2 | 6/1996 |
| WO | WO 95/20299 | 7/1995 |
| WO | WO 95/28809 | 10/1995 |
| WO | WO 96/20570 | 7/1996 |
| WO | WO 96/20572 | 7/1996 |

OTHER PUBLICATIONS

Alverhne, M. et al, "GSM Services and Facilities for the User", Proceedings of the Nordic Seminar on Digital Land Mobile Radio Communications (DMR), (1990), Seminar No. 4, pp. 15.1–1–12.

Yen, So–Lin et al, "Intelligent MTS Monitoring System", Proceedings of the Annual International Camahan Conference on Security Technology, Albuquerque, (1994), pp. 185–187.

"D1—Das Mobilfunk–Netz der Deutschen Telekom Mobil-Net", (1996), pp. 288–297.

Siemens, System Description: D900, Mobile Communication System, (1992), pp. 1–75.

Biala, Jacek, "Mobilfunk und Intelligente Netze", (1994), pp. 291–310.

* cited by examiner

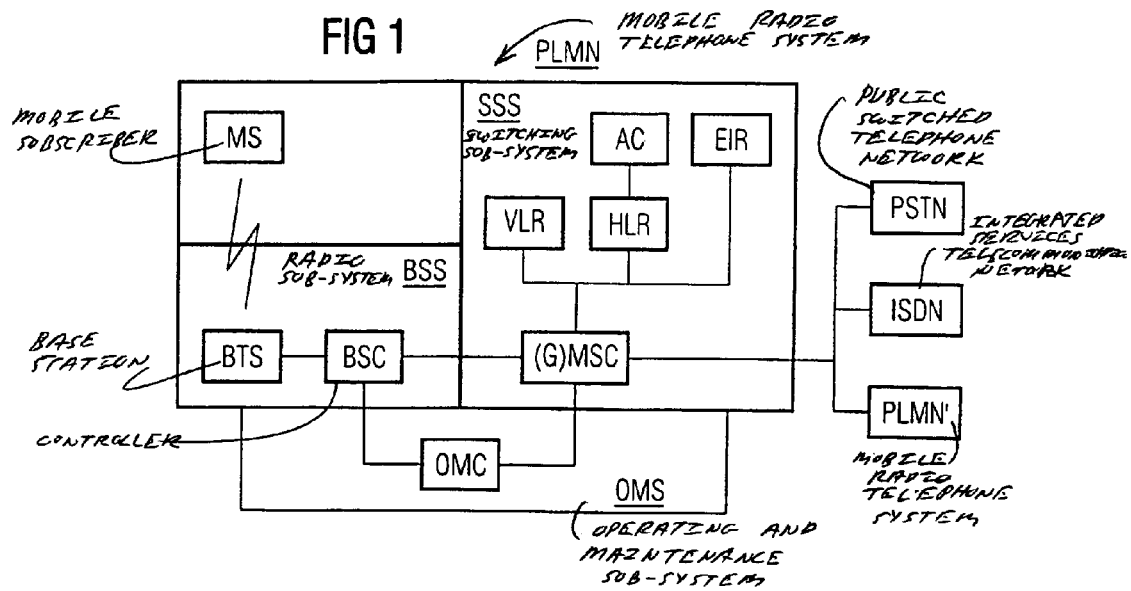
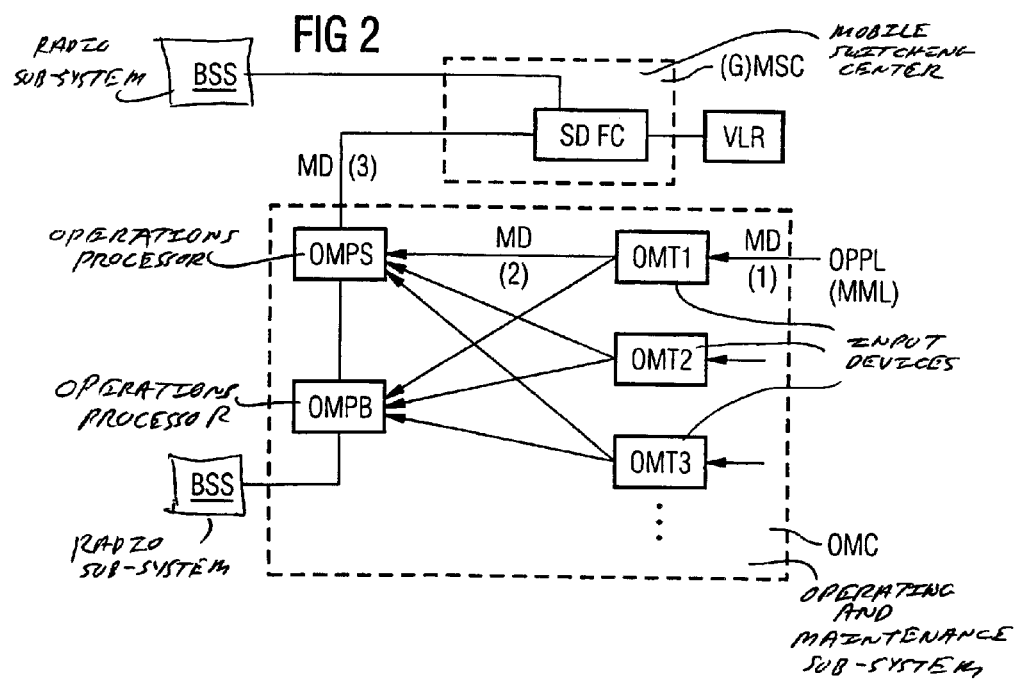

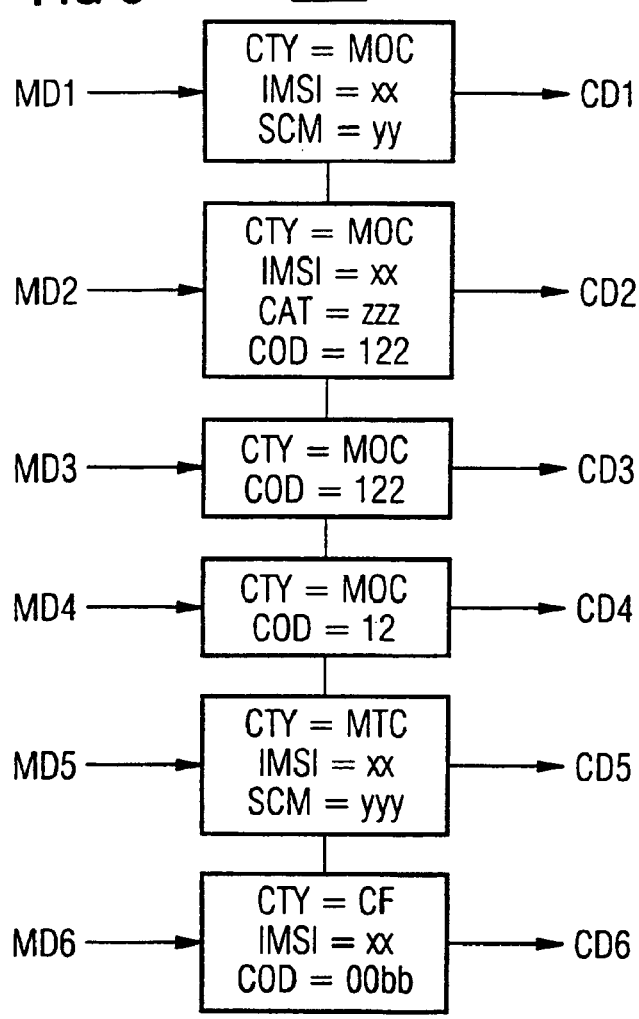
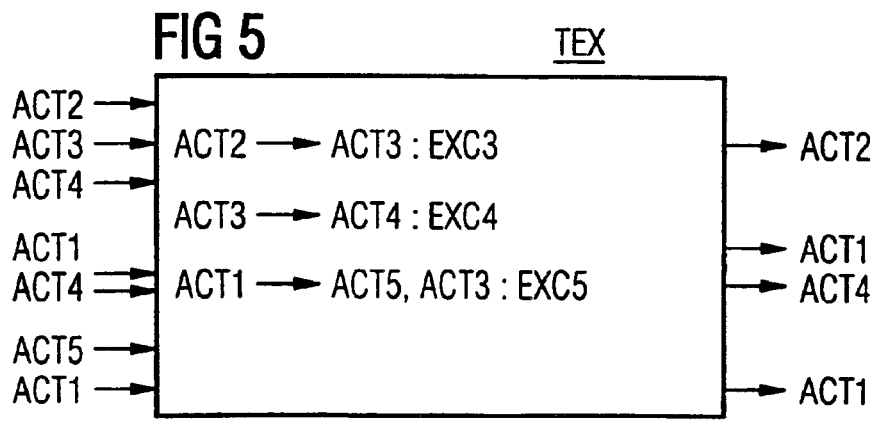

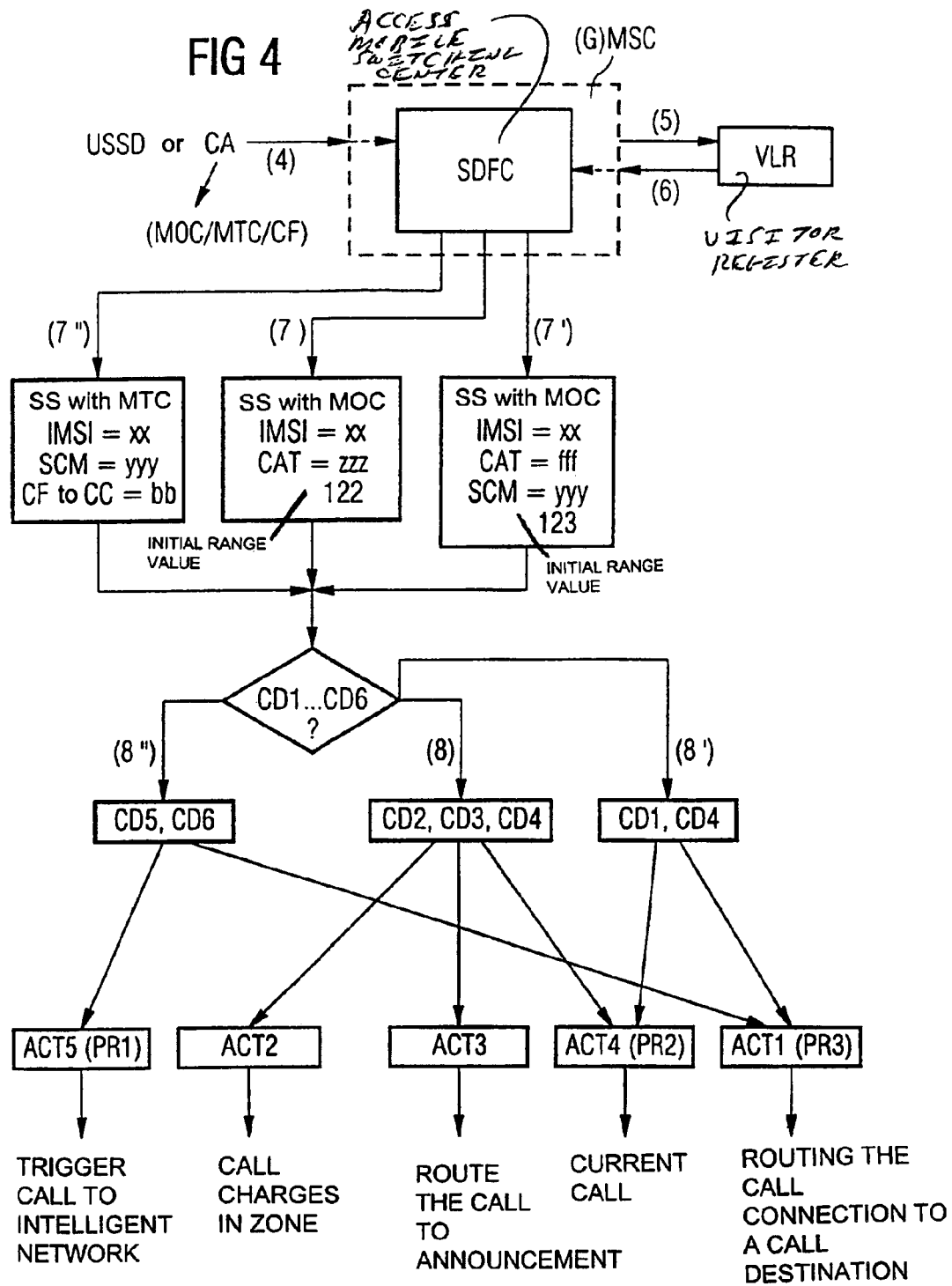

METHOD FOR CONTROLLING SWITCHING-ORIENTED ACTIONS IN A MOBILE RADIO TELEPHONE SYSTEM AND SUCH A MOBILE RADIO TELEPHONE SYSTEM

BACKGROUND OF THE INVENTION

The invention is directed to a method for controlling switching-oriented actions in a mobile radio telephone system or, respectively, to such a mobile radio telephone system.

As known, a mobile radio telephone system comprises at least one radio-oriented sub-system with base station controllers and base stations that see to radio connections from and to mobile stations of radio telephone subscribers via an air interface, comprises a switching-oriented sub-system with subscriber data bases and mobile switching centers for line-switched connections and comprises an operating and maintenance sub-system for the administration and control of the devices arranged distributed in the radio-oriented sub-system and in the switching-oriented sub-system - see, for example, "D1-Das Mobilfunk-Netz der Deutschen Telekom MobilNet", Unterrichtsblätter, Volume 49, Jun. 1996, pages 288 through 297,or "CME-A Total Solution for GSM Networks", Ericsson Review, Vol. 68, No. 3, pp. 72 through 79. The switching-oriented actions such as, for example, the routing of call connections, the acquisition of call charges, etc., are thereby uniformly initiated for all subscribers, usually on the basis of the subscriber telephone number.

International application WO 95/20299 discloses a GSM mobile radiotelephone system that provides individual subscriber services such as, for example, supplementary services for which the routing of an outgoing call connection is decided by a central subscriber database (HLR) at the request of the switching center. For supplementary services relating to incoming call connections, the subscriber data base supplies additional routing information at the request of the switching equipment, whereby the subscriber database can distinguish between a plurality of routing alternatives according to one version of the method.

The sole possibility of making switching-oriented actions such as, for example, the routing of call connections flexibly available to individual or selected radio telephone subscribers is comprised in making agreements between the operator of the mobile radio telephone system and the manufacture of a system component and of working complicated modifications into the existing method execution. A flexible administration of existing or of new switching-oriented actions potentially involves long waiting times and a considerable outlay of processing capacity for the manufacturer of the system components. This results therein that the realization of, in particular, new demands of the system operators in view of the control of switching-oriented actions such as, for example, the introduction of specific services for selected groups of subscribers and in view of flexibility and expansion of an existing mobile radio telephone system is not possible without added outlay for the manufacturers of the system components.

SUMMARY OF THE INVENTION

An object of the present invention is to specify a method and a mobile radio telephone system of the species initially cited with which the switching-oriented actions can be more flexibly controlled and adapted to the demands of the system operators in view of administration and modification.

In accord therewith, respective mobile radio telephone-specific data for defining conditions for a subscriber-dependent control of the actions are established in the mobile switching center for one or more radio telephone subscribers via the operating and maintenance sub-system. Given an incoming or outgoing call or given a message transmission, call-related data and/or subscriber-specific data are evaluated by the mobile switching center with respect to the conditions and, when the condition is met, at least one action is controlled subscriber-dependent A mobile radio telephone system according to the invention has a mobile switching center in which the mobile radio telephone-specific data respectively offered via the operating and maintenance sub-system for defining conditions for a subscriber-dependent control of the actions are established. Over and above this, the mobile switching center comprises a means that, given an incoming or outgoing call or given a message transmission, respectively evaluates the call-related data and/or the subscriber-specific data with reference to the conditions and, when the condition is met, controls at least one action subscriber-dependent.

The advantage of the invention is that the routing of the call connections, the acquisition of the call charges, etc., can be subscriber-individually set and implemented dependent on specific data call-related and/or subscriber-specific—that are evaluated with respect to the conditions stored in the mobile switching center. For the system operator of the respective mobile radio telephone system, this means that he himself can very flexibly enter the criteria and parameters for the actions to be controlled subscriber-individually into the mobile switching center for individual radio telephone subscribers or for a plurality of radio telephone subscribers as well via the operating and maintenance sub-system. Consultations between manufacturers of the system components and the system operator are no longer required.

It has proven beneficial to define the conditions for the subscriber-dependent control of the actions either by an individual call-related/subscriber-specific datum or by linking a plurality of call-related/subscriber-specific data. It is also advantageous when, given a plurality of conditions that have been met, different switching-oriented actions are controlled subscriber-dependent. Actions are preferably provided with priority numbers that indicate a sequence of the actions to be controlled given the parallel existence of a plurality of satisfied conditions. This leads to the fact that, given a call, a plurality of actions can be controlled subscriber-dependent and an advantageous sequence of the switching-oriented actions can thereby be achieved on the basis of the priority numbers allocated to the actions.

It is also advantageous when, given the parallel existence of a plurality of satisfied conditions, blocking information with which respectively at least one action is excluded from the subscriber-dependent control by another action are employed. If, for example, three actions would have to be implemented due to the satisfied conditions, what the blocking information can achieve is that the second action precludes the first action, so that only the second action and the third action are to be implemented. The blocking information also provide the possibility that an action simultaneously excludes a plurality of other actions from the control.

According to a development of the invention, the nature of the call (outgoing call, incoming call, incoming call with call redirection) or, respectively, the nature of the message transmission (USSD container messages) are valid, for example, as call-related data that are evaluated with reference to the conditions. According to another development of the invention, the international mobile subscriber identity, the mobile subscriber category, the service class mark for triggering services of an intelligent network and/or the auxiliary services that can be used by the subscriber are valid as subscriber-specific data.

Given an outgoing call, the subscriber telephone number selected by the mobile subscriber or a numerical range of these subscriber telephone numbers and, given an incoming call, the mobile subscriber roaming number assigned in the mobile radio telephone system or a numerical range of these mobile subscriber roaming numbers are preferably evaluated as mobile radio telephone-specific data. When the incoming call is a matter of a call with call redirection to a destination telephone number, it has proven beneficial to also evaluate the destination telephone number of a numerical range of these destination telephone numbers for the subscriber-dependent control of at least one switching-oriented action.

In addition to being directed to the routing of call connections and the acquisition of the call charges, the actions controllable subscriber-dependently given satisfied conditions also relate to the authorization or, respectively, suppression of services/performance features, the blocking of calls or the suppression of a call redirection—potentially with a rerouting of the call to an announcement means for a specific announcement—, the insertion of subscriber-individual information for telephone number modification, the listening-in on call connections, the re-evaluation of an abbreviated code selected by the subscriber into a telephone number having the usual length. The subscriber-dependent control of an action is especially advantageous wherein a call connection is routed to a service control point of an intelligent network and the class of service character is thereby placed preceding the destination telephone number.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements and in which:

FIG. 1 depicts a block circuit diagram of the basic structure of a mobile radio telephone system;

FIG. 2 depicts a block circuit diagram of the establishment of mobile radio telephone-specific data via the operating and maintenance sub-system in a mobile switching center of the mobile radio telephone system;

FIG. 3 depicts examples for the definition of conditions for a subscriber-dependent control of switching-oriented actions on the basis of the mobile radio telephone-specific data;

FIG. 4 depicts a block circuit diagram of the method execution for subscriber-dependent control of different actions in the mobile switching center, and FIG. 5 depicts an exclusion table for specific actions given parallel existence of a plurality of satisfied conditions

DESCRIPTION OF THE PREFERRED EMBODIMENTS

The mobile radio telephone system PLMN based, for example, on the GSM standard comprises a plurality of basic elements that are composed of a radio-oriented sub-system BSS, of a switching-oriented sub-system SSS and of an operating and maintenance sub-system OMS. The radio-oriented sub-system BSS thereby undertakes the transmission and control functions for communication connections from or, respectively, to mobile stations MS of mobile subscribers. The overall area of coverage of the mobile radio telephone system PLMN is subdivided into a great plurality of radio cells wherein the connections from and to the mobile stations MS can be set up, maintained and cleared down via base stations BTS and connections from the mobile stations MS to the base stations BTS of the mobile radio telephone system via an air interface. One or more base stations BTS are serviced by one or more base station controllers BSC. The base stations BTS distributed over the entire coverage area of the mobile radio telephone system from radio stations that offer all functions respectively required at the antenna locations. Usually, the base station BTS services a radio cell that, however, can be divided into two or more sectored cells due to the employment of directional antennas. The base station controllers BSC that assume the critical control functions in the radio processing form the intelligent part of the radio-oriented sub-system BSS. Over and above this, they form the interface of the radio-oriented sub-system BSS to the switching-oriented subsystem SSS in that they are connected to its mobile switching centers MSC.

The switching-oriented sub-system SSS usually comprises a plurality of mobile switching centers MSC by which the mobile radio telephone-specific switching functions for the call control are respectively implemented. Each mobile switching center MSC can thereby switch a connection between the mobile radio telephone system PLMN and a fixed network, for example, the public switched telephone network PSTN or the integrated services telecommunication network ISDN, and another mobile radio telephone system PLMN or between respectively two mobile stations MS within its own mobile radio telephone system PLMN. Given a connection between two mobile stations MS within a mobile radio telephone system, the connection is set up from one mobile switching center to another mobile switching center or within the one and the same mobile switching center.

For the communication connections to other telecommunication systems, the switching-oriented sub-system SSS comprises at least one mobile switching center that is referenced as access mobile switching center GSMC. The access mobile switching center GMSC thus forms the interface in the mobile radio telephone system PLMN for call respectively incoming from a different telecommunication system or, respectively, for calls respectively outgoing to other telecommunication systems. One of several subscriber data bases, the visitor register VLR, is realized with a physical system node with the respective mobile switching center MSC in order to offer the subscriber data of the mobile subscribers currently residing in a coverage area of the mobile switching center for the call handling. Over and above this, there are further subscriber data bases in the switching-oriented sub-system SSS, whereof a central subscriber data base, the home register HLR, permanently stores the subscriber data of the mobile subscribers registered in the mobile radio telephone system and, over and above this, contains information about the access authorization of a mobile subscriber to the mobile radio telephone system, as well as about the visitor register VLR that is responsible for the mobile subscriber on the basis of his current location. The operating and maintenance sub-system OMS that comprises at least one operating and maintenance center OMC as system elements is connected to the radio-oriented sub-system BSS and to the switching-oriented sub-system SSS. The operating and maintenance center OMC assumes operating and maintenance functions such as, for example, the central administration of the network elements in the radio-oriented subsystem BSS and in the switching-oriented sub-system SSS, the communication to these network elements via, for example, a data network as well as the communication between specific network elements of the switching-oriented sub-system SSS and an overlapping operating system. Over and above this, the operating and maintenance subsystem OMS represents the interface between a mobile radio telephone system operator and the respective network elements of the radio-oriented sub-system BSS and of the switching-oriented sub-system SSS.

FIG. 2 shows the block circuit diagram of an operation and maintenance center OMC that, according to FIG. 1, comprises both interfaces to the radio-oriented sub-system BSS as well as to the switching-oriented sub-system with the mobile switching center MSC or, respectively, the access mobile switching center GMSC. The operation and maintenance center OMC comprises at least one operations processor OMPS for the central administration of the system elements of the switching-oriented sub-system and at least one operations processor OMPB for the central administration of the system elements of the radio-oriented sub-system BSS. In addition to its operating and maintenance functions, the operating processors OMPS and OMPB assume the communication to the individual system elements—for example, via a packet-switched data network (PSDN). Over and above this, the operation and maintenance center OMC has input devices OMT1, OMT2, OMT3 . . . , that form the interface between the system operator OPPL of the mobile radio telephone system and the operations processors OMPS, OMPB and, thus, the system elements of the radio-oriented oriented sub-system BSS and of the switching-oriented sub-system. The input devices OMT1 . . . can, for example, be standard work station computers (workstations) that are realized with the functions of a graphic user interface and with alphanumerical command input. The input devices OMT1 . . . are respectively connected to the operating processors OMPS, OMPB. The mobile switching center MSC (or, respectively, GMSC) of the switching-oriented sub-system is connected to the operations processor OMPS of the operation and maintenance center OMC, this mobile switching center MSC (or, respectively, GMSC) being responsible in the present example for the call handling given incoming or outgoing calls or for the message transition given employment of container messages (USSD, unstructured supplementary services data) dependent on the location of the mobile subscriber.

The mobile switching center MSC comprises a subscriber-dependent processing and feature control SDFC for the subscriber-dependent control of the switching-oriented actions that, for example, are composed of the subscriber-dependent acquisition of the call charges or, for example, of the subscriber-dependent authorization or, respectively, suppression of services and/or performance features (in this respect see the examples described in detail in FIG. 4). Mobile radio telephone-specific data MD for one or more mobile subscribers are offered via the operation and maintenance sub-system, preferably via the operation and maintenance center OMC, and are established for the definition of conditions for the subscriber-dependent control of the switching-oriented actions in the mobile switching center MSC. Thus, the mobile radio telephone-specific data MD for the respective mobile subscriber are input (1) into the input devices OMT1 . . . , for example subscriber-individually by the system operator OPPL of the mobile radio telephone system via MML commands (man machine language commands) and are transmitted therefrom to the operations processor OMPS (2). The mobile radio telephone-specific data MD proceed (3) to the subscriber-dependent processing and feature control SDFC via the interfaces existing between the operation and maintenance center OMC and the mobile switching centers. All mobile switching centers MSC in the mobile radio telephone system are preferably respectively equipped with a subscriber-dependent processing and feature control SDFC in order to be able to effect the subscriber-dependent control of the switching-oriented actions independently of the momentary location of the mobile subscriber. Conditions—usually a plurality of conditions—for the subscriber-dependent control of the switching-oriented actions in the mobile switching center MSC are defined and established on the basis of the mobile radio telephone-specific data MD arriving via the operation and maintenance sub-system. Given a call and/or call-related data for the case of a message transmission and/or subscriber-specific data are evaluated by the subscriber-dependent feature control SDFC in view of the conditions and, given a met condition or, respectively, met conditions, one or more actions are subsequently specifically controlled for the mobile subscriber affected by the call or, respectively, by the message transmission.

As in every call handling or, respectively, message transmission, the subscriber data of the mobile subscriber that are stored for the duration of the subscriber's location in the coverage area of the visitor register are interrogated. Included among the subscriber data are, for example, the international mobile subscriber identifier (IMSI), the services and supplementary services that the mobile subscriber can use, the location data in the form of a location area identify, call-related data such as, for example, call redirection data given a call incoming in the mobile radio telephone system with a call forwarding set for the mobile subscriber to a specific destination telephone number, as well as security data with, for example, an encryption code (Kc). Given, for example, an incoming call (mobile terminated call), the visitor register assigns a mobile subscriber roaming number (MSRN) at the request of the home register in order to set up the call connection to the mobile switching center from which the line-switch connection is to be setup to the called mobile subscriber and in order to address the subscriber data of the mobile subscriber in the respective visitor register VLR. Over and above this, the mobile subscriber can be identified on the basis of his subscribe category that, for example, contains particulars about a possible activation/deactivation of the listening-in of the call connection in the mobile radio telephone system or particulars about the nature of the charge calculating, for example by a debit center. The data entered for the subscriber also include a service class mark (SCM) for triggering services of an intelligent network. One or more service control points (SCP) in the intelligent network respectively form a network node to the central controller of services in interaction with service switching points (SSP). The service control point thereby evaluates inquiries of the service switching points, determines destination telephone numbers and sets up the call connections to the interface between mobile switching center MSC and service control point (SCP). The service class mark SCM can thereby be composed of a telephone number that is assigned in the numerical range limited for assigning telephone numbers.

On the basis of examples, FIG. 3 shows the definition of various conditions for the subscriber-dependent control of switching-oriented actions by the respective mobile switching center or, respectively, the subscriber-dependent feature control in the mobile switching center. The mobile radio telephone-specific data and the conditions derived therefrom are preferably deposited in a subscriber data base of the mobile switching center for the mobile subscriber or subscribers. In the illustrated examples—a total of six examples—at least two mobile radio telephone-specific input data are respectively operated to form a condition. Fundamentally, however, it is also possible that a condition is to be attributed only to a single mobile radio telephone-specific input datum. The mobile radio telephone-specific data recited in the examples are not definitive but merely form examples of the possible parameters from which subscriber-dependent conditions are derived for the control of switching-oriented actions. Both subscriber-specific data such as, for example, the international mobile subscriber identity IMSI, the service class mark SCM, the subscriber category CAT, as well as call-related data such as, for example, the call type CTY and/or numerical ranges COD of telephone numbers can thereby be employed as mobile radio telephone-specific input data. In addition to the mobile radio-telephone-specific data that have been cited and that are shown in the examples of FIG. 3, for example, the length of the telephone number—for example, the location telephone number given an incoming call or the destination telephone number giving an outgoing call with call redirection or the telephone number selected given an outgoing call—or an information about the registration of the mobile subscriber in the subscriber's mobile radio telephone system or in some other communication system—for example, in another mobile radio telephone system—or an indication about the source of the subscriber telephone number given an incoming call—for example, telephone number received from the subscriber or from a service control point of the intelligent network or by reinterpretation of an abbreviated code dialed by the subscriber—can be interpreted by the mobile switching center.

In the illustrated examples, thus, a condition CD1 derives from the mobile radio telephone-specific data MD1 when it is a matter of an outgoing call CTY=MOC (mobile originated call) with an international mobile subscriber identifier IMSI=xx and a service class mark SCM=yy. A further example supplies a condition CD2 on the basis of mobile radio telephone-specific data MD2 that are composed of the call type CTY=MOC, of the international mobile subscriber identifier IMSI=xx, of a subscriber category CAT=zzz and of a numerical range COD=122 for the selected telephone number. A condition CD3 is defined by the mobile radio telephone-specific data MD3 wherein the call type CTY=MOC is AND-operated with the numerical range COD=122. Likewise, a further condition CD4 derives from the AND-operation of only second mobile radio telephone-specific data MD4 that are composed of the call type CTY=MOC and of the numerical range of the selected telephone number COD=12. A condition CD5 derives from mobile radio telephone-specific data MD5 that contain the call type CTY=MTC (radio mobile terminated call), the international mobile subscriber identifier IMSI=xx and a service class mark SCM=yyy as parameters for the subscriber-dependent condition. The last example refers to a condition CD6 that derives from mobile radio telephone-specific data MD6 composed of the call type CTY=CF (call forwarding) of the international mobile subscriber identifier IMSI=xx and of the numerical range COD=00bb from which the call destination can be read on the basis of the call forwarding set for the mobile subscriber given the incoming call. The designations xx, yy, zzz and bb merely represent space holders for the digits of the call numbers to be taken into consideration or for parts of the service class mark or, respectively, of the subscriber category.

In a block circuit diagram with flow chart, FIG. 4 shows the method execution for the subscriber-dependent control of different switching-oriented actions by the subscriber-dependent feature control of the mobile switching center MSC (or, respectively, GMSC). The access mobile switching center (GMSC) is inserted into the call handling when it is a matter of an incoming call MTC from, for example, the public switched telephone network—potentially supplemented by a call forwarding CF. In the cases of an outgoing call MOC, the mobile switching center MSC currently responsible for the calling mobile subscriber due to his location is responsible for the call handling and the control of the switching-oriented actions to be subscriber-individually implemented. When is matter of a call CA of the above-described type or of a message transmission USSD wherein the information are transmitted in the form of container messages, the mobile switching center MSC produces the call connection to the mobile subscriber affected by the call CA or, respectively, the message transmission USSD. Dependent on the incoming call information (4) or, respectively, message information, the mobile switching center MSC thereby interrogates the appertaining visitor register VLR (5) in order to obtain (6) the subscriber data stored for the mobile subscriber.

From the call-related data and the subscriber-specific data, the mobile switching center MSC, for example on the basis of the subscriber-dependent feature control SDFC, determines whether the conditions defined for the subscriber-dependent control of the switching-oriented actions are satisfied. To this end, the call-related data and/or the subscriber-specific data are previously evaluated by the subscriber-dependent feature control with reference to the conditions. To this end, FIG. 4 shows three exemplary embodiments of the subscriber-dependent control of different actions corresponding to the mobile radio telephone-specific input data given an incoming call or, respectively, given an outgoing call. The central component part of the method execution is an interrogation by the subscriber-dependent feature control SDFC as to whether one of the conditions CD1 . . . CD6 described in FIG. 3 applies and, thus, at least one switching-oriented action is controlled subscriber-dependent. In the first example (7), it is a matter of an outgoing call MOC that is initiated by a mobile subscriber SS [sic]. The mobile subscriber having the international mobile subscriber identifiers IMSI=xx [sic] and for subscriber category CAT=zzz thereby calls a telephone number that begins with the numerical range 122. By checking the conditions that have been established, the subscriber-dependent feature control SDFC recognizes that a plurality of conditions CD2, CD3 and CD4 are satisfied in parallel (8)—also see FIG. 3. Advantageously, each of the conditions CD2 . . . CD4 leads to a different switching-oriented action that is to be specifically implemented for the calling mobile subscriber. In a second example (7'), the call is likewise a matter of an outgoing call MOC, whereby the mobile subscriber SS having the international mobile subscriber identifier IMSI=xx and a different subscriber category CAT=fff selects a telephone number that begins with the numerical range 123. Over and above this, a service class mark SCM=yyy is entered in the visitor register for this mobile subscriber. A check of the data for the present outgoing call in view of the conditions individually established for one or more subscribers yields as a result that the condition CD1 and the condition CD4 are met (8').

A further example (7") relates to an incoming call MTC that is directed to a mobile subscriber having the international mobile subscriber identifier IMSI=xx and the service class mark SCM=yy. Over and above this, a call forwarding CF to a call destination has been set for the called mobile subscriber, this being defined by the country identifier CC=bb. The evaluation of the subscriber-specific and/or of the call-related data with reference to the conditions shows that the condition CD5 and the condition CD6 are met (8").

Let it be assumed for all examples that different switching-oriented actions are controlled by the mobile switching center MSC due to the satisfied conditions. A switching-oriented action ACT1 that is composed of the routing of the call connection to a specific call destination thus derives from the satisfied condition CD1. This has the advantage that, given ambiguous telephone numbers, different destinations can be selected dependent on the length of the telephone numbers, recognizable on the basis of the respective numerical range of the telephone number. This can be applied to all types of calls, whether incoming or outgoing call or incoming call with call forwarding. The presence of the conditions CD2 leads to a corresponding switching-oriented action ACT2 wherein the call charges for the call are acquired subscriber-dependent in one or more specific zones. The zoning for the charge acquisition thus ensues dependent on the international mobile subscriber identifier IMSI of the subscriber. What this effects is that calls are differently billed subscriber-dependently according to the mobile subscriber identifier.

The conditions CD3 leads to a switching-oriented action ACT3 wherein the call is routed to an announcement means that makes selected announcements available, for example in different languages as well. The condition CD4 leads to a switching-oriented action ACT4 that is composed of the current element of the call connection. When conditions CD5 is satisfied, the control of the switching-oriented action ACT5 ensues subscriber-dependent, the call connection being triggered such therewith that a branch to a service control point of an intelligent network IN is implemented for using additional services and/or performance features. When condition C06 is satisfied, the control of the switching-oriented action ACT1 likewise ensues subscriber-dependent.

The actions indicated in the examples are not definitive, but only a selection of possible switching-oriented functions that can be implemented flexibly dependent on the conditions established for the mobile subscriber. Due to the establishment of mobile radio telephone-specific data for determining the conditions for the subscriber-dependent control of switching-oriented actions, the system operator of the mobile radio telephone system has the possibility of himself flexibly initiating the specific switching-oriented actions for the respective mobile subscribers and of modifying them at any time. When a plurality of conditions are established in parallel in the mobile switching center and when these conditions—as in the present example—lead to different actions, then the sequence of the actions to be implemented can be potentially significant. A priority number that defines a sequence of the switching-oriented actions to be controlled can therefore be allocated to every action. Thus, for example, a priority number PR1 is allocated to the switching-oriented action ACT5, a priority number PR2 is allocated to the switching-oriented action ACT4 and a priority number PR3 is allocated to the switching-oriented action ACT1. This means that, when a plurality of conditions are simultaneously met, the action ACT5 is to be implemented before the action ACT4 and the [...] ACT4 is to be respectively implemented before the action ACT1. In the present example, the two switching-oriented actions ACT2 and ACT3 have no priority numbers allocated to them. Additionally or alternatively to assigning priority numbers, it can be indicated in a table given parallel existence of a plurality of satisfied conditions that a specific action precludes at least one further action. When, for example, the conditions for the switching-oriented actions ACT1 and ACT3 apply in parallel, the exclusion of action ACT3 by the action ACT2 can be effected by allocation of a blocking information (see FIG. 5).

Since all switching-oriented actions controllable subscriber-dependent cannot be shown for reasons of presentation, let the following actions also be cited. Dependent only on the international mobile subscriber identifier IMSI or, respectively, dependent on a numerical range of the mobile subscriber identifiers ISMI, an outgoing call can be blocked by simple cleardown or by rerouting to an announcement. The numerical range of the mobile subscriber identifiers IMSI can, for example, be limited to digits of the country code and/or of the national code. The message transition with container messages USSD can likewise be blocked for certain subscribers, recognizable on the basis of a numerical range of the mobile subscriber numbers ISMI. Incoming calls for the mobile subscriber can likewise be cleardown or rerouted to an announcement dependent on the mobile subscriber numbers of the called mobile subscriber or, respectively, the numerical range thereof. A further criterion for blocking or rerouting the call is composed, for example, of the location of the called mobile subscriber, recognizable on the basis of the mobile subscriber roaming number (MSRN). Dependent on the mobile subscriber identifier of the called mobile subscriber, call reroutings given incoming calls can be suppressed, whereby a distinction can be made between a call rerouting and the access mobile switching center (GMSC) and the call rerouting in the visited mobile switching center (visited MSC). Likewise, the call rerouting can be suppressed dependent on the mobile subscriber identifiers of the called mobile subscriber and dependent on the destination telephone number given a call rerouting or, respectively, dependent on numerical ranges of the destination telephone number. The call rerouting to specific call destinations, recognizable, for example, on the basis of the country codes of specific countries, can also be suppressed and be accompanied by a rerouting to an announcement or by the cleardown of the call. Over and above this, the assigning of the service class marks SCM is independent of the respective numbering plan, whereby the service class mark SCM was usually to be established as a number in the number converter of the mobile switching center. This has the advantage that the numerical ranges that were previously occupied by the service class marks SCM are free for some other use. Likewise, a zoning on the basis of the service class marks no longer need be implemented for fee calculation.

As a result of the subscriber-individual establishment of the mobile radio telephone-specific data that define conditions for the subscriber-dependent control of switching-oriented actions, there is the possibility of assigning abbreviated codes in a mobile radio telephone system that begin with the same digits as a subscriber telephone number of a mobile subscriber, as long as it is assured that the abbreviated code and the subscriber telephone number differ in terms of the length of the telephone number. The invention also makes it possible to employ the abbreviated codes for cell-related or subscriber-related routing of call connections dependent on the mobile subscriber identifier IMSI. Another switching-oriented action is composed in the specific routing of call connections by modification of the telephone number, in that subscriber-specific information are inserted into the modified telephone number. These subscriber-specific information can be composed, for example, of the location area code (cell ID), of the location telephone number, of the selected subscriber telephone number, of the length of the selected telephone number and/or of the national code of the subscriber.

FIG. 5 shows a table TEX that, for example, is implemented in the control means of the respective mobile switching center. The table TEX serves for the exclusion of specific actions by other actions, whereby at least one further action is blocked by an action. For this reason, blocking information are assigned to the switching-oriented actions, what further actions are excluded by them proceeding therefrom. A blocking information EXC3 thus defines that the action ACT2 excludes the action ACT3 given parallel existence of the actions ACT2 and ACT3. A blocking information EXC4 effects the exclusion of the action ACT4 by the action ACT3. A blocking information EXC5 causes that a plurality of actions, namely the actions ACT3 and ACT5, are simultaneously excluded by the action ACT1. What this means for the examples recited in FIG. 4 is that the actions ACT2, ACT3 and ACT4 to be implemented due to the satisfied condition [...] only the action ACT2 is implemented. It also applies to the actions ACT5 and ACT1 implementable in parallel that only the latter action ACT1 is possible. By contrast thereto, the two actions ACT1 and ACT4 to be implemented due to the conditions satisfied in parallel are unaffected by the exclusion table TEX, so that both actions—potentially taking-allocated priority numbers into consideration—respectively involve a switching-oriented action.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for controlling switching-oriented actions in a mobile radio telephone system having at least one radio-oriented sub-system with base station controllers and base stations for radio connections from and to mobile stations of mobile subscribers, having a switching-oriented sub-system with subscriber data bases and mobile switching centers for line-switched connections and having an operation and maintenance sub-system, the operation and maintenance sub-system having at least one operation and maintenance center for administration and control of devices provided in the radio-oriented sub-system and in the switching-oriented sub-system, comprising:

establishing in a mobile switching center respective mobile radio telephone-specific data for defining conditions for a subscriber-contended control of actions in a mobile switching center, the data being established subscriber-individually for at least one mobile subscriber via the operation and maintenance sub-system; and respectively evaluating in the mobile switching center, given one of an incoming calls an outgoing call or a message transmission at least one of call-related data and subscriber specific data with respect to the conditions and, given a satisfied condition, controlling at least one action subscriber-dependent.

2. The method according to claim 1, wherein the conditions for the subscriber-dependent control of the actions are respectively defined by one of a single, call-related/subscriber-specific datum and an operation of a plurality of call-related/subscriber-specific data.

3. The method according to claim 2, wherein operation of the call-related/subscriber specific data ensues via at least one of a logical AND operation and a logical OR operation.

4. The method according to claim 1, wherein, given a plurality of satisfied conditions, different actions are controlled subscriber-dependent.

5. The method according to claim 1, wherein, given the parallel existence of a plurality of satisfied conditions, the actions are provided with priority numbers with which is defined a sequence of the actions to be controlled.

6. The method according to claim 4, wherein, given parallel existence of a plurality of satisfied conditions, blocking information is used to exclude a respective action of said actions from the control by another action of said actions.

7. The method according to claim 6, wherein the blocking information is entered into a table that is located in one of the mobile switching center and a subscriber data base of the mobile switching center.

8. The method according to claim 1, wherein one of a type of call or type of message transmission is evaluated as call-related data.

9. The method according to claim 1, wherein one of an international mobile subscriber identifier, a service class mark for triggering services of an intelligent network, a mobile subscriber category or supplementary services usable by the mobile subscriber is evaluated as subscriber-specific data.

10. The method according to claim 1, wherein given an outgoing call, a subscriber telephone number selected by the mobile subscriber or a numerical range of the selected subscriber telephone number is evaluated and, wherein the location telephone number or a numerical range of the location telephone number assigned in the mobile radio telephone system, respectively, is evaluated given the incoming call.

11. The method according to claim 1, wherein, given an incoming call with call forwarding to a destination telephone number, the destination telephone number or a numerical range of the destination telephone number is evaluated.

12. The method according to claim 1, wherein one of blocking of a call, suppression of a call forwarding, and blocking of message transmission is controlled subscriber-dependent as an action.

13. The method according to claim 1, wherein one of cleardown of a call and routing of a call to an announcement device are controlled subscriber-dependent as actions.

14. The method according to claim 1, wherein one of routing of a call connection to a specific destination and acquisition of call charges in a specific charge zone are controlled subscriber-dependent as actions.

15. The method according to claim 1, wherein routing of a call connection to a service control point of an intelligent network is controlled subscriber-dependent as an action, and a service class mark is thereby set preceding a destination telephone number.

16. The method according to claim 1, wherein a telephone number modification by insertion of subscriber-individual information into one of a selected telephone number given an outgoing call, a location telephone number given an incoming call or a destination telephone number given an incoming call with call forwarding is controlled subscriber-dependent as an action.

17. The method according to claim 1, wherein an eavesdropping of a call connection or an authorization or, respectively, suppression of services/performance features are controlled subscriber-dependent as actions.

18. The method according to claim 1, wherein a conversion of an abbreviated code selected by the subscriber into a telephone number is controlled subscriber-dependent as an action.

19. A mobile radio telephone system for controlling switching-oriented actions, comprising:

at least one radio-oriented sub-system that has base station controllers and base stations for radio connections from and to mobile stations of mobile subscribers;

a switching-oriented sub-system that has subscriber data bases and mobile switching centers for line-switched connections, an operation and maintenance sub-system having at least one operation and maintenance center for administration and control of devices provided in the radio-oriented sub-system and in the switching-oriented sub-system;

mobile radio telephone-specific data for defining conditions for a subscriber-dependent control of the actions, the mobile radio telephone specific data being subscriber-individually set -up for at least one mobile subscriber in the mobile switching center via the operation and maintenance sub-system, the mobile switching center having a device that, given an incoming call or an outgoing call or given a message transmission, respectively evaluates at least one of call-related data and subscriber-specific data with reference to the conditions and, given a satisfied condition, controls at least one action subscriber-dependent.

* * * * *